(12) United States Patent
Jennings et al.

(10) Patent No.: US 10,427,075 B2
(45) Date of Patent: Oct. 1, 2019

(54) DEBRIS STRAINER FOR GAS TURBINE ENGINE COOLING FLOW

(71) Applicant: United Technologies Corporation, Farmington, CT (US)

(72) Inventors: Timothy J. Jennings, West Hartford, CT (US); Christopher Whitfield, Manchester, CT (US); David Richard Griffin, Tolland, CT (US); Christopher Cosher, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 206 days.

(21) Appl. No.: 15/627,809

(22) Filed: Jun. 20, 2017

(65) Prior Publication Data

US 2018/0361284 A1 Dec. 20, 2018

(51) Int. Cl.
| | | |
|---|---|---|
| F03B 11/00 | (2006.01) | |
| B01D 35/28 | (2006.01) | |
| B01D 35/02 | (2006.01) | |
| F02C 7/055 | (2006.01) | |
| F01D 25/32 | (2006.01) | |
| B01D 46/24 | (2006.01) | |
| F02C 7/05 | (2006.01) | |

(52) U.S. Cl.
CPC ............ *B01D 35/28* (2013.01); *B01D 35/02* (2013.01); *B01D 46/2403* (2013.01); *F01D 25/32* (2013.01); *F02C 7/055* (2013.01); *F03B 11/00* (2013.01); *F02C 7/05* (2013.01); *F05D 2260/607* (2013.01)

(58) Field of Classification Search
CPC ........................................................ F03B 11/00
USPC ........................................................ 415/115
See application file for complete search history.

(56) References Cited

U.S. PATENT DOCUMENTS

| | | |
|---|---|---|
| 6,019,575 A | 2/2000 | Boursy |
| 7,147,684 B2 | 12/2006 | Anderson et al. |
| 7,770,375 B2 | 8/2010 | Alvanos et al. |
| 2004/0221720 A1 | 11/2004 | Anderson et al. |
| 2007/0048122 A1* | 3/2007 | Van Suetendael, IV ................... B01D 46/40 415/115 |
| 2013/0192257 A1 | 8/2013 | Horine et al. |

FOREIGN PATENT DOCUMENTS

EP 2093384 A2 8/2009

OTHER PUBLICATIONS

European Search Report for European Application No. 18178792.0 dated Dec. 13, 2018.

\* cited by examiner

*Primary Examiner* — Robert A Hopkins
(74) *Attorney, Agent, or Firm* — Carlson, Gaskey & Olds, P.C.

(57) ABSTRACT

A gas turbine engine includes an engine static structure that provides a flow path. A metering hole is provided in the engine static structure. A strainer is arranged over the metering hole. The strainer includes multiple holes that have a total area that is greater than a metering hole area.

13 Claims, 4 Drawing Sheets

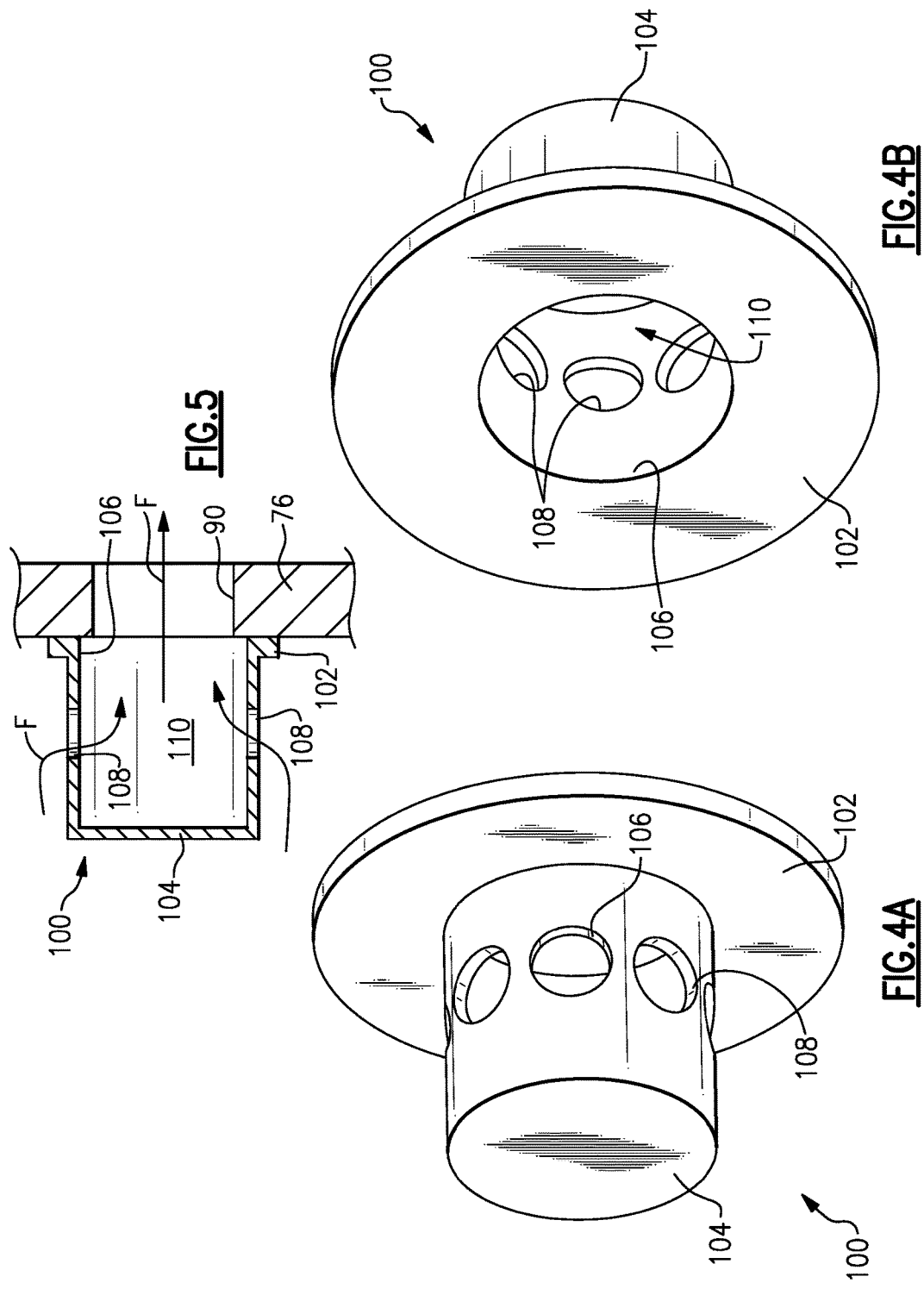

DEBRIS STRAINER FOR GAS TURBINE ENGINE COOLING FLOW

BACKGROUND

This disclosure relates to a component and configuration for removing debris from a cooling flow in a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Typical compressor and turbine sections include fixed vanes and rotating blades that seal with respect to blade outer air seals (BOAS). A secondary flow system is provided between the BOAS and vanes and the high pressure turbine case structure. This flow is used to cool various components within the very hot high pressure turbine section during engine operation. Some of the cooling passages in components within the high pressure turbine are relatively small and are fed by the secondary cooling flow. Debris carried by the secondary flow can clog these passages.

An erosion energy dissipater has been used in the secondary flow path to choke the flow and reduce the velocity of any debris carried by the secondary flow. One end of the dissipater has a large diameter outlet orifice, and the other end has multiple inlet orifices, which have a total area that is much smaller than a large diameter outlet orifice. The relative total areas of the inlet and outlet orifices reduce the energy of the debris in the secondary flow when passing through the dissipater.

SUMMARY

In one exemplary embodiment, a gas turbine engine includes an engine static structure that provides a flow path. A metering hole is provided in the engine static structure. A strainer is arranged over the metering hole. The strainer includes multiple holes that have a total area that is greater than a metering hole area.

In a further embodiment of any of the above, a turbine section provides a secondary flow path corresponding the flow path. The secondary flow path is provided between a case structure and a vane and a blade outer air seal.

In a further embodiment of any of the above, one of the vane, the case structure and the blade outer air seal provide the metering hole.

In a further embodiment of any of the above, the case structure includes a vane support to which the vane is mounted. The vane support provides the metering hole.

In a further embodiment of any of the above, the vane includes an aft rail. A seal is provided between the vane support and the aft rail to provide a first cavity. The strainer is provided within the first cavity.

In a further embodiment of any of the above, the vane support includes a radially extending planar annular wall. The metering hole is provided in the wall.

In a further embodiment of any of the above, a second seal is provided between the aft rail and a blade outer air seal support to which the blade outer air seal is mounted. A second cavity is provided between the case structure and the first and second seals. The strainer is fluidly arranged between the first and second cavities.

In a further embodiment of any of the above, the strainer is secured to the wall.

In a further embodiment of any of the above, the strainer includes a flange that has an opening. A cup extends from the flange and provides a pocket. The holes are provided in the cup.

In a further embodiment of any of the above, the flange is planar and is secured to the engine static structure by brazing or welding.

In a further embodiment of any of the above, the total area of the holes is greater than the opening.

In a further embodiment of any of the above, the cup is cylindrical and the holes are provided about a periphery of the cup.

In another exemplary embodiment, a method cooling a gas turbine engine includes flowing fluid through a strainer that has inlet holes with a larger total area than a metering hole over which the strainer is secured.

In a further embodiment of any of the above, the flowing step includes providing a secondary flow to a high pressure turbine between a case structure and a vane and a blade outer air seal.

In a further embodiment of any of the above, the strainer extends in an axial direction along which the second flow travels.

In a further embodiment of any of the above, the flange has an opening and a cup extends from the flange and provides a pocket. The holes are provided in a periphery of the cup and the total area is greater than and opening area. The flange is planar and annular in shape. An end of the cup is closed.

In another exemplary embodiment, a flow strainer for a gas turbine engine includes a flange that has an opening. A cup extends from the flange and provides a pocket. Multiple holes are provided in the cup and have a total area that is greater than and opening area.

In a further embodiment of any of the above, the flange is planar and annular in shape.

In a further embodiment of any of the above, the cup is cylindrical and the holes are provided about a periphery of the cup.

In a further embodiment of any of the above, an end of the cup is closed.

BRIEF DESCRIPTION OF THE DRAWINGS

The disclosure can be further understood by reference to the following detailed description when considered in connection with the accompanying drawings wherein:

FIG. 3 is an enlarged view of the high pressure turbine section illustrating a secondary flow there through.

FIGS. 4A and 4B are perspective views of a strainer used to filter large debris in the secondary flow.

FIG. 5 is a cross-sectional view through the strainer shown in FIGS. 4A and 4B.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
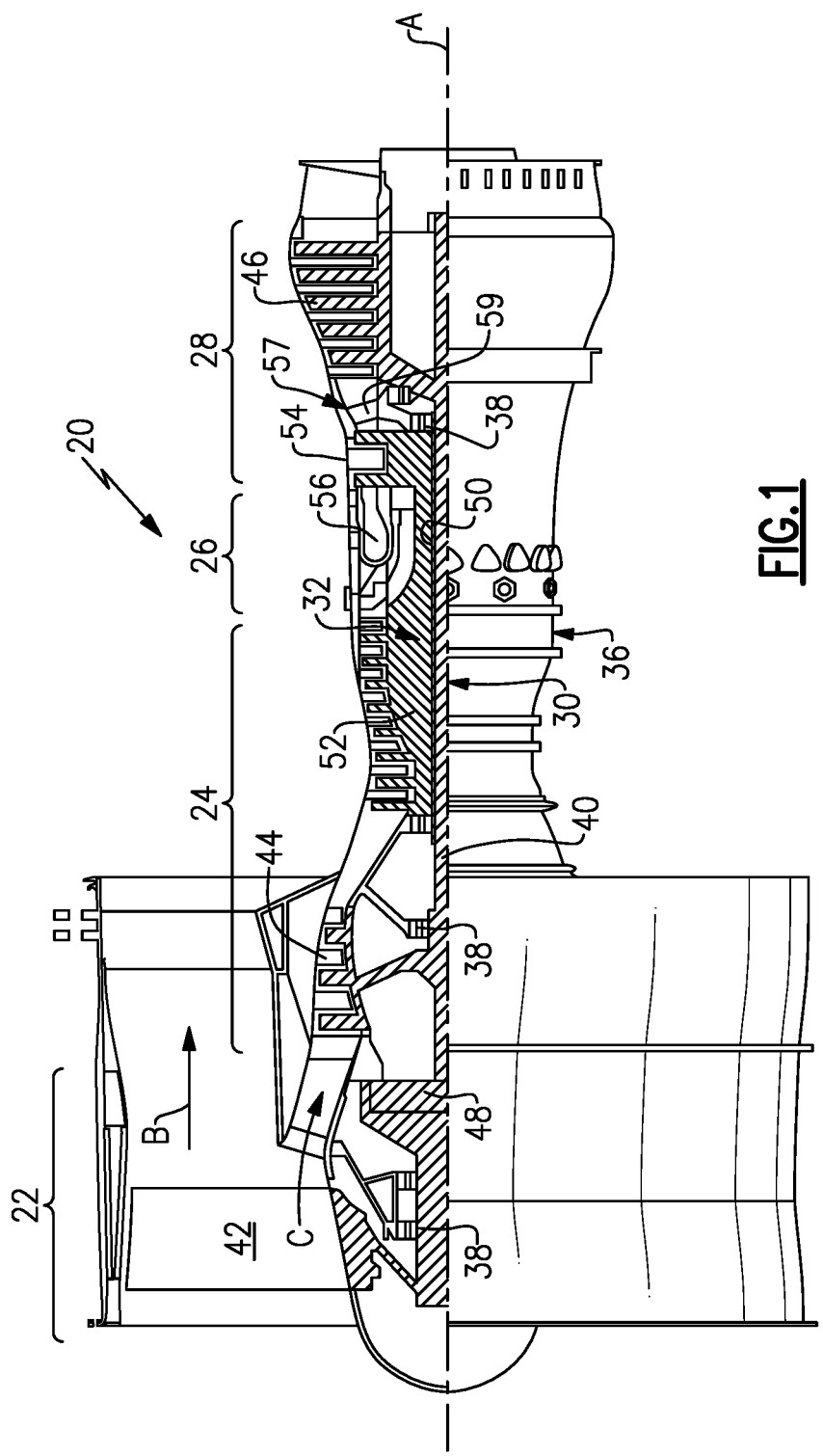
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second (350.5 meters/second).

Figure 2:
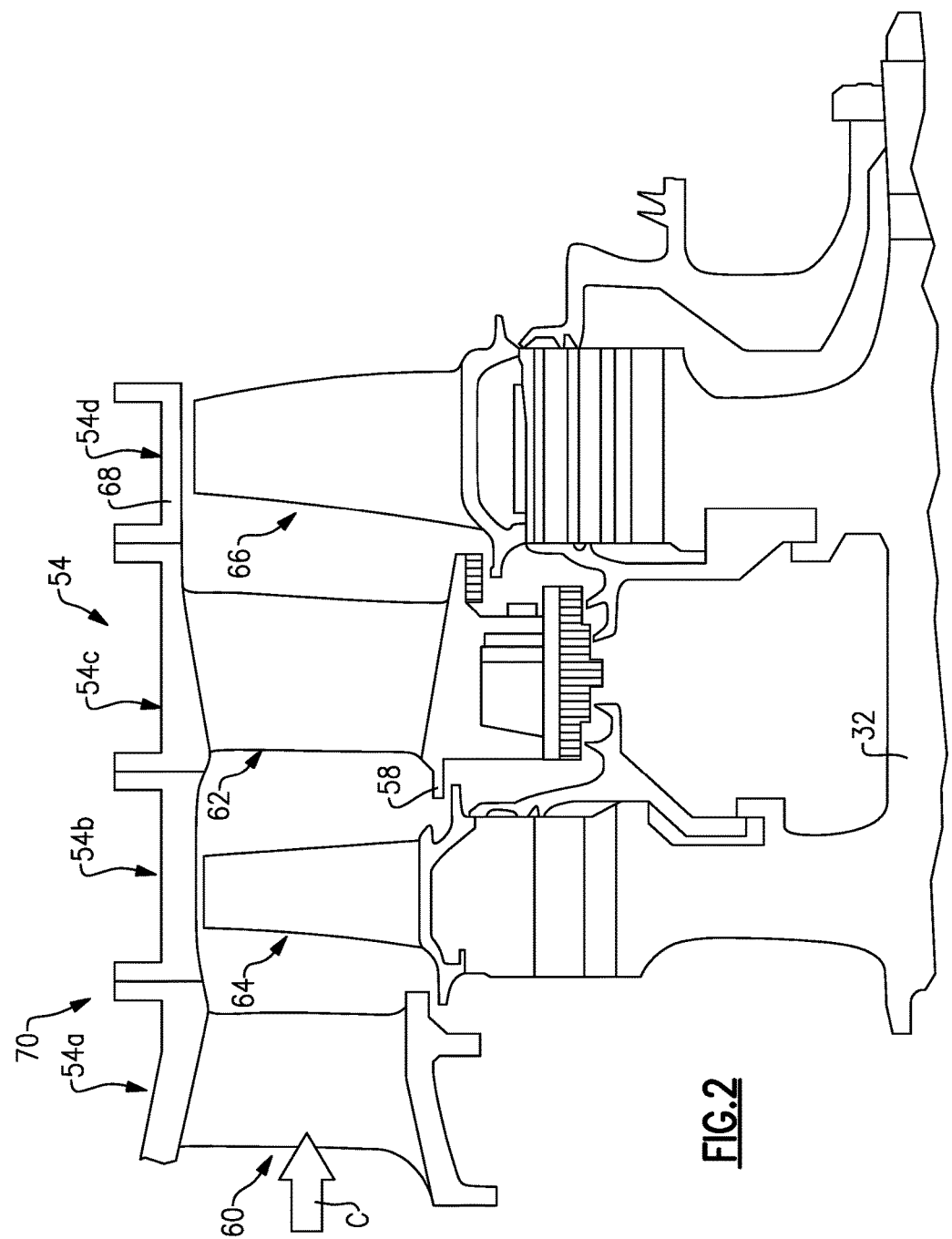
FIG. 2 is a schematic view of one example high pressure turbine section.

Referring to FIG. 2, a cross-sectional view through the high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64 is arranged axially between the first and second fixed vane arrays 54a, 54c. A second stage array 54d of circumferentially spaced turbine blades 66 is arranged aft of the second array 54c of fixed vanes 62.

The turbine blades each include a tip adjacent to a blade outer air seal 68 of a case structure 70, which is part of the engine static structure 36. The first and second stage arrays 54a, 54c of turbine vanes and first and second stage arrays 54b, 54d of turbine blades are arranged within the core flow path C and are operatively connected to the high speed spool 32.

Figure 3:
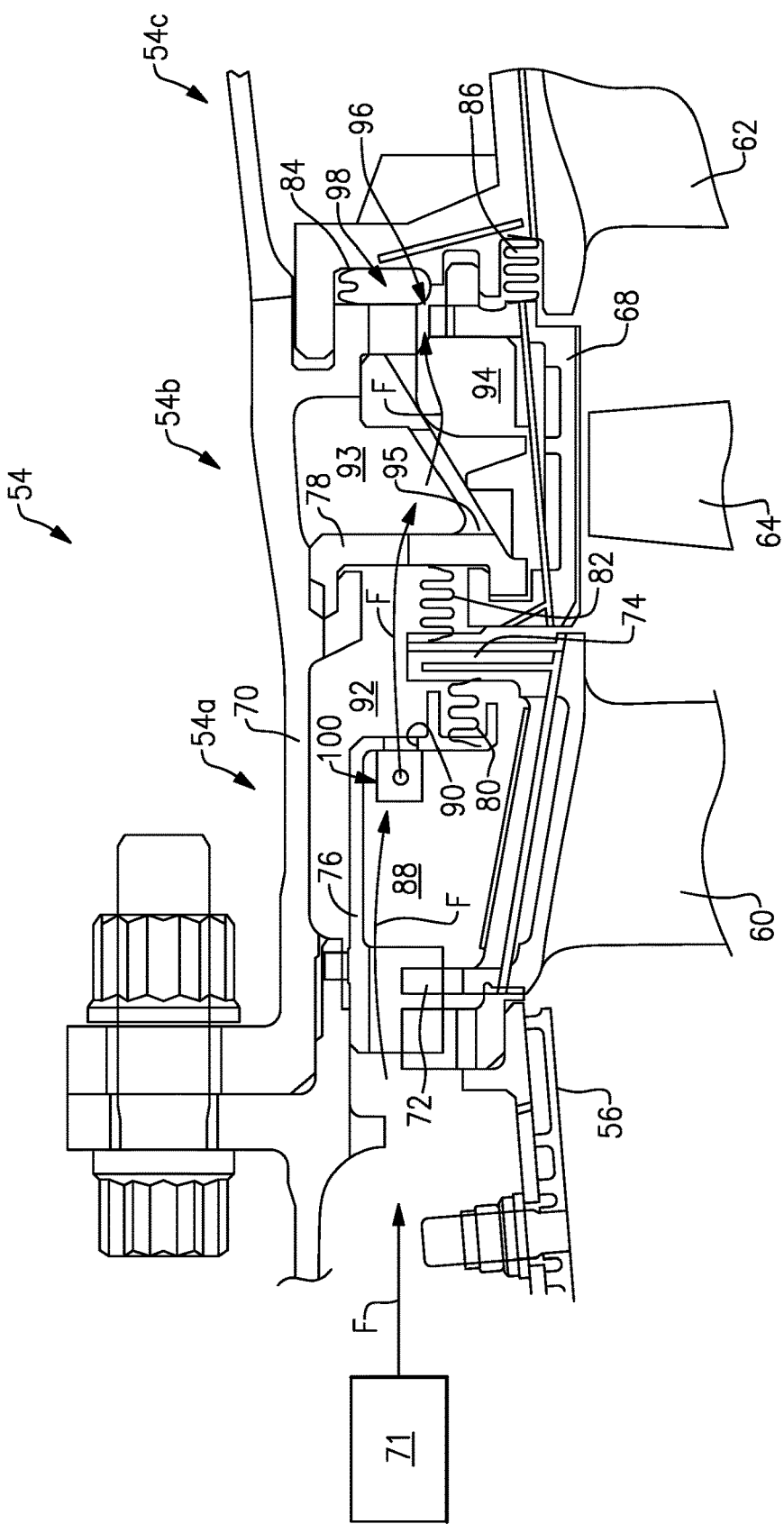

FIG. 3 illustrates a secondary flow F from a cooling source 71, which may be provided by a stage of the compressor section 24, through the high pressure turbine section 54. It should be understood that the disclosed cooling configuration may be used in other sections of the engine. In the example, the vane 60 is supported with respect to the case structure 70 via a vane support 76 attached to the case structure 70. The vane 60 includes forward and aft rails 72, 74 between forming a first cavity 88 that is enclosed by a first seal 80 provided between the vane support 76 and the aft rail 74. The case structure 70 includes a BOAS support 78 to which the BOAS 68 is mounted. A second seal 82 is provided between the BOAS support 78 and the aft rail 74. A second cavity 92 is provided between the case structure 70 and the first and second seal 80, 82.

A third cavity 93 is provided between case structure 70 and the BOAS support 78, and a fourth cavity 94 is provided between the BOAS support 78 and the BOAS 68. Third and fourth seals 84, 86 are respectively provided between the second vane 62 and the case structure 70 and the BOAS 68 to provide a fifth cavity 98. More or few components may be used that shown, and the components may be configured differently than illustrated.

In operation, the secondary flow F provided from the cooling source 71 flows through the first cavity 88 through a metering hole 90 in the vane support 76 to the second cavity 92. The secondary flow F then flows through the BOAS support 78 into the third cavity 93 and through an aperture 95 in the BOAS support 78 to the fourth cavity 94. A gap 96 fluidly interconnects the fourth cavity 94 to the fifth cavity 98. The metering hole 90 may be provided elsewhere along the secondary flow path.

The secondary flow F may be fed from the various cavities to passages in components within the high pressure turbine section 54, for example, impingement holes and feed holes in vane 60, BOAS 68, vane 62 and/or other components. These passages are relatively small in size and are susceptible to becoming plugged with debris over time, which can result in burning of the component.

A strainer 100 is arranged over the metering hole 90 to strain large debris from the secondary flow F, which may accumulate within the secondary flow path or clog the passages. Referring to FIGS. 4A-5, the strainer 100 includes a flange 102, which is annular in shape in the example, providing an outlet opening 106. A cup 104 provided by a cylinder that is closed at one end extends from the flange 102 and provides a pocket 110 that is in fluid communication with the opening 106. Other shapes may be used to provide the strainer. In the example, multiple inlet holes 108 are provided about a periphery of the cup 104 and are directed at one another. Individual hole size is selected based upon debris size to be strained. In one example, the holes 108 provide a total area that is larger than wither of the opening 106 and the metering hole 90 such that the metering hole 90 provides the fluid metering downstream from the first cavity 88 along secondary flow path rather than the holes 108. The strainer 100 reduces the collection of particles by reducing the impingement velocity as well as physically straining any debris with the holes 108.

The strainer 100 is mounted to a surface where the debris will collect in an acceptable area, for example, the first cavity 88. In the example, the vane support 76 provides a radially extending annular wall providing a planar surface to which the flange 102 of the strainer 100 is mounted in the axial direction. Debris can safely collect near the aft rail 74 beneath the first spring 80 and/or along the vane support 76 at the bottom of the annulus. The flange 102 is also planar and is secured to the vane support 76 over the metering hole 90 by brazing or welding, for example.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   engine static structure providing a flow path;
   a turbine section that provides a secondary flow path corresponding the flow path, the secondary flow path is provided between a case structure and a vane and a blade outer air seal, wherein the vane includes an aft rail, and a seal is provided between the vane support and the aft rail to provide a first cavity;
   a metering hole provided in the engine static structure; and
   a strainer arranged over the metering hole, the strainer including multiple holes having a total area that is greater than a metering hole area, wherein a second seal is provided between the aft rail and a blade outer air seal support to which the blade outer air seal is mounted, a second cavity is provided between the case structure and the first and second seals, the strainer is fluidly arranged between the first and second cavities.

2. The gas turbine engine of claim 1, wherein the case structure includes a vane support to which the vane is mounted, the vane support provides the metering hole.

3. The gas turbine engine of claim 1, wherein the vane support includes a radially extending planar annular wall, and the metering hole is provided in the wall.

4. A gas turbine engine comprising:
   engine static structure providing a flow path;
   a turbine section that provides a secondary flow path corresponding the flow path, the secondary flow path is provided between a case structure and a vane and a blade outer air seal, wherein the case structure includes a vane support to which the vane is mounted, wherein the vane support includes a radially extending planar annular wall;
   a metering hole provided in the wall; and
   a strainer arranged over the metering hole, the strainer including multiple holes having a total area that is greater than a metering hole area, wherein the strainer is secured to the wall.

5. The gas turbine engine of claim 4, wherein the vane includes an aft rail, and a seal is provided between the vane support and the aft rail to provide a first cavity, wherein the strainer is provided within the first cavity.

6. A gas turbine engine comprising:
   engine static structure providing a flow path;
   a metering hole provided in the engine static structure; and
   a strainer arranged over the metering hole, the strainer including multiple holes having a total area that is greater than a metering hole area, wherein the strainer includes a flange having an opening, and a cup extends from the flange and provides a pocket, the holes are provided in the cup.

7. The gas turbine engine of claim 6, wherein the flange is planar and secured to the engine static structure by brazing or welding.

8. The gas turbine engine of claim 6, wherein the total area of the holes is greater than the opening.

9. The gas turbine engine of claim 6, wherein the cup is cylindrical and the holes are provided about a periphery of the cup.

10. A flow strainer for a gas turbine engine comprising:
a flange having an opening, and a cup extends from the flange and provides a pocket, multiple holes are provided in the cup and have a total area that is greater than and opening area.

11. The strainer of claim 10, wherein the flange is planar and annular in shape.

12. The strainer of claim 10, wherein the cup is cylindrical and the holes are provided about a periphery of the cup.

13. The strainer of claim 12, wherein an end of the cup is closed.

* * * * *